Figure 3:
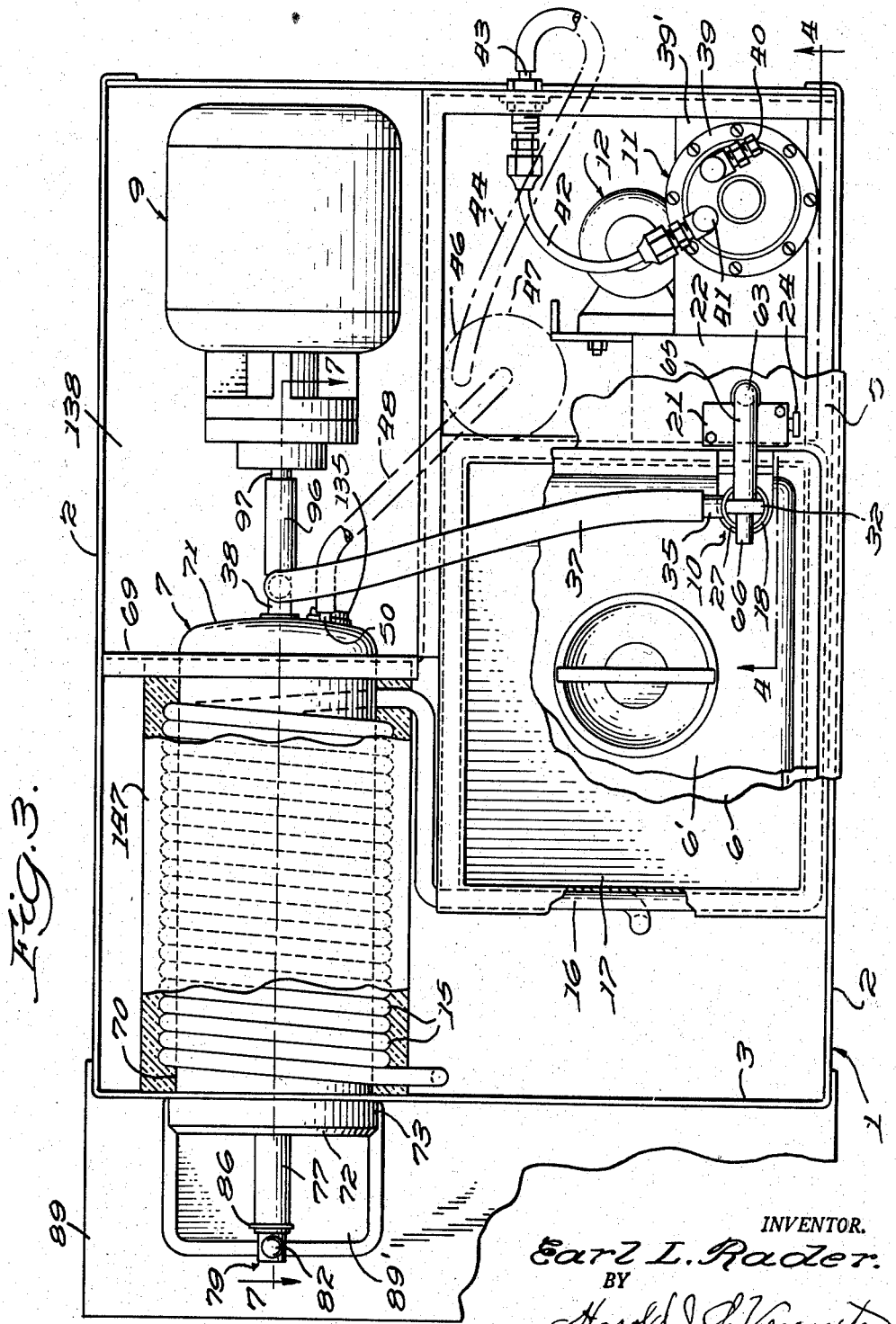

July 28, 1959 E. L. RADER 2,896,421
FOOD PRODUCT PREPARING AND DISPENSING MACHINE
Filed May 23, 1955 6 Sheets-Sheet 1
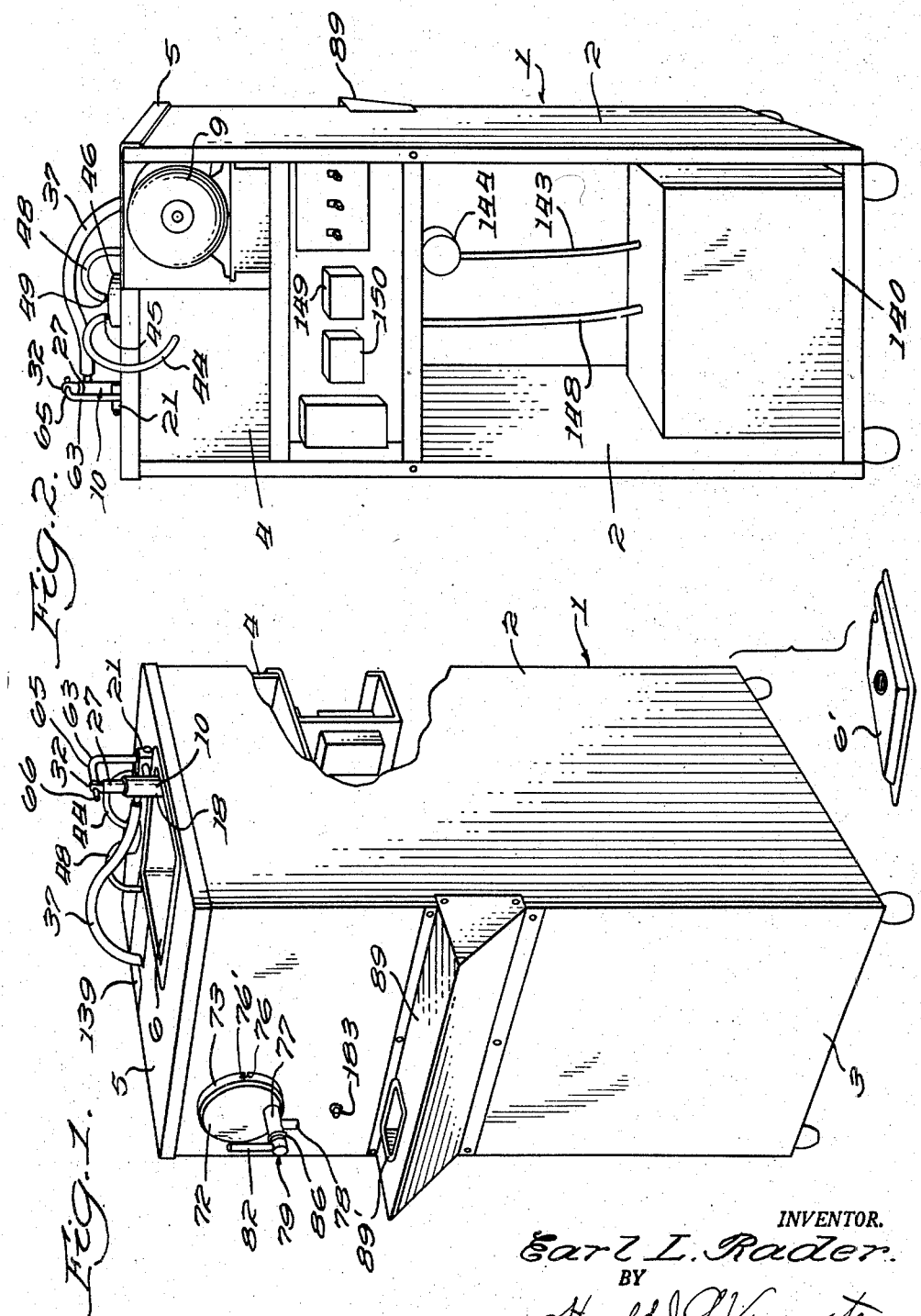
INVENTOR.
Earl L. Rader.
BY
Harold J. LeVisconte
Atty.

July 28, 1959 E. L. RADER 2,896,421
FOOD PRODUCT PREPARING AND DISPENSING MACHINE
Filed May 23, 1955 6 Sheets-Sheet 2

INVENTOR.
Earl L. Rader.
BY
Harold J. LeVesconte
Atty.

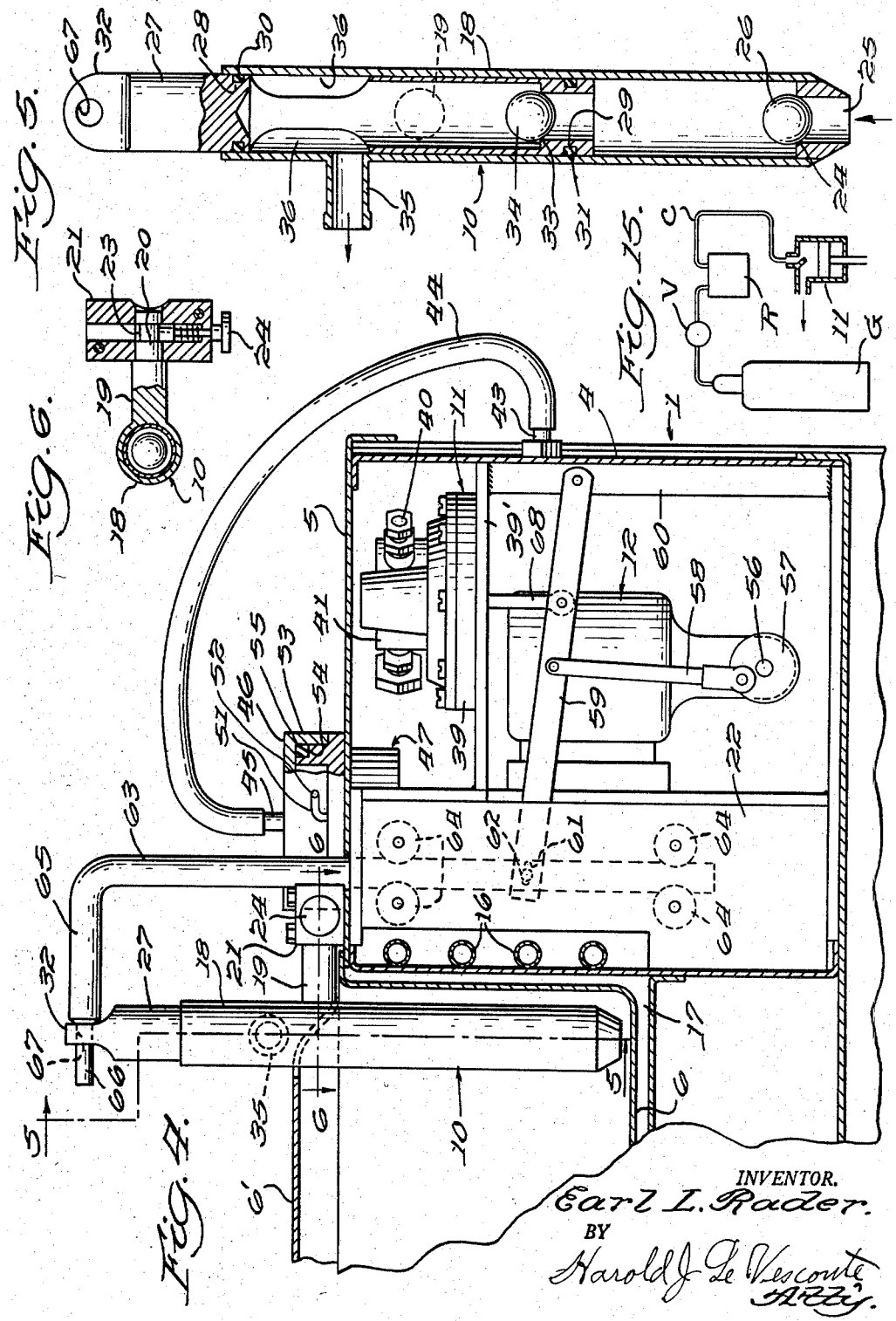

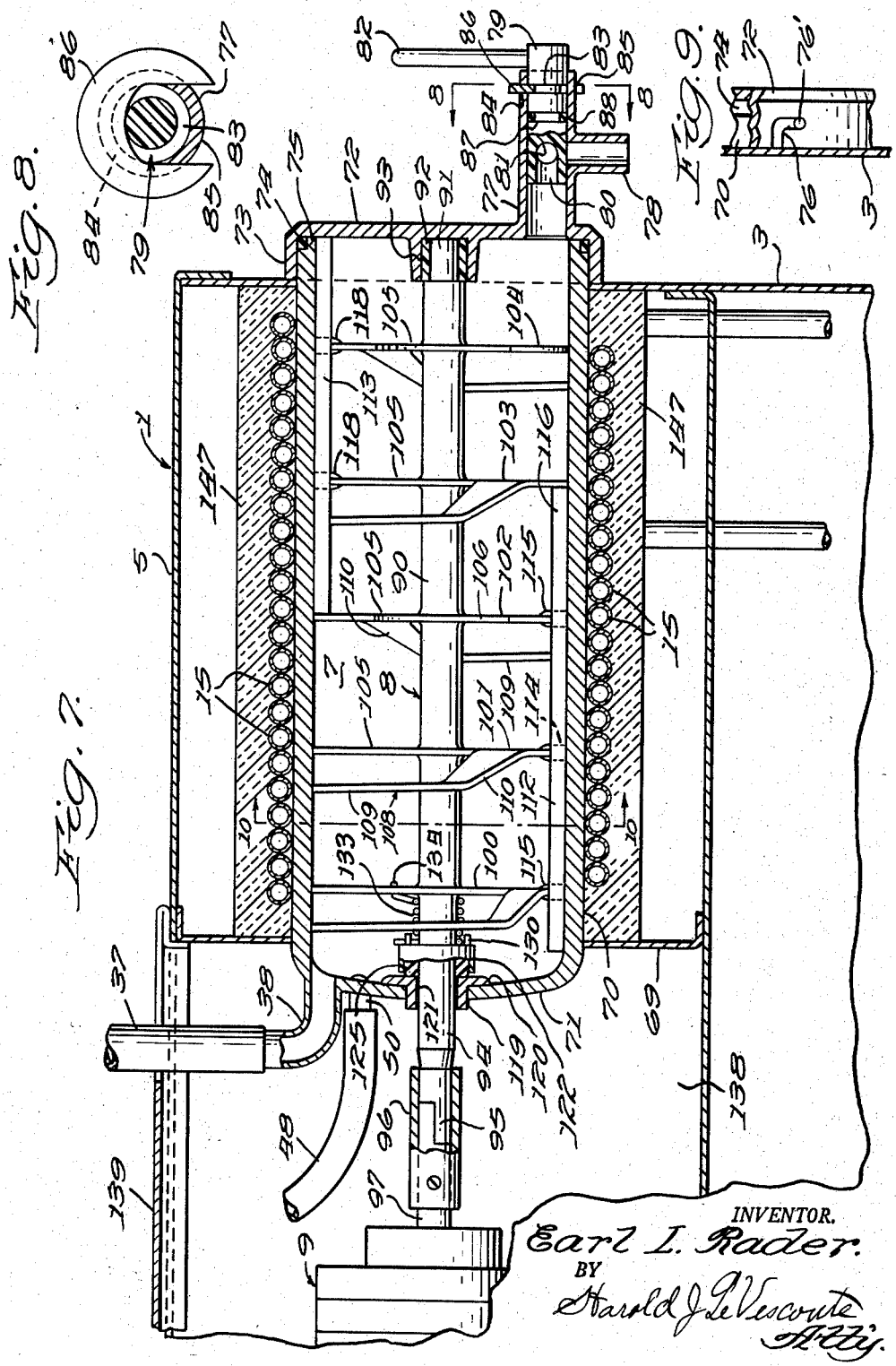

July 28, 1959
E. L. RADER
2,896,421
FOOD PRODUCT PREPARING AND DISPENSING MACHINE
Filed May 23, 1955
6 Sheets-Sheet 5
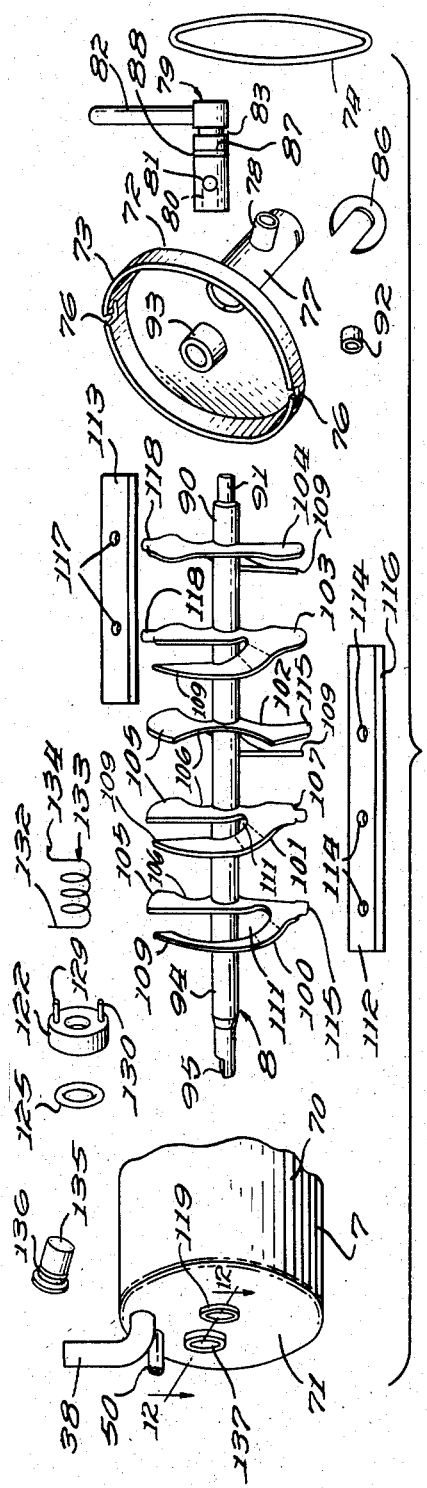
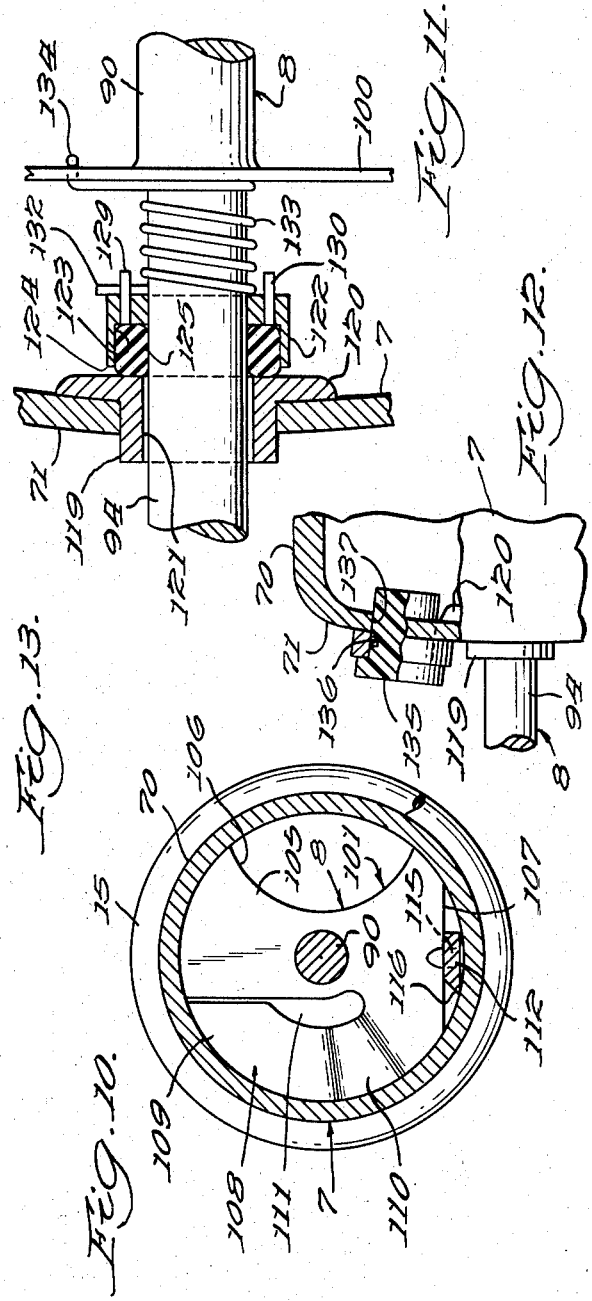
INVENTOR.
Earl L. Rader.
BY
Harold J. Le Vescorte
Atty.

July 28, 1959 E. L. RADER 2,896,421
FOOD PRODUCT PREPARING AND DISPENSING MACHINE
Filed May 23, 1955 6 Sheets-Sheet 6

INVENTOR.
*Earl L. Rader,*
BY
*William P. Green*
ATTORNEY.

United States Patent Office 2,896,421
Patented July 28, 1959

2,896,421
FOOD PRODUCT PREPARING AND DISPENSING MACHINE

Earl L. Rader, Burbank, Calif.

Application May 23, 1955, Serial No. 510,151

32 Claims. (Cl. 62—135)

This invention relates to machines for preparing cold and semi-frozen comestibles from fluid ingredients which may be a combination of liquid and gaseous ingredients or may be entirely composed of liquid ingredients and which machine maintains a constant supply of finished product which is automatically replenished with ingredients upon the withdrawal of any of the finished product.

The specifically described embodiment of the invention relates to a machine for producing cold, milk base beverages e.g., malted milk beverages, but by certain modifications also described the machine may be readily adapted for the production of other comestibles such as soft ice cream, or other semi-fluid ices, or other products formed from combinations of fluids and gases; the latter being either air or carbon dioxide. The machine is intended for use in locations in which the product is dispensed from the machine and served directly to customers, this usage taking into account the fact that at times the machine may be in constant operation and at other times may be idle for varying periods of time which may range from, say, a minute or two, to as much as several hours.

Heretofore, there have been many attempts to provide a completely successful machine for this purpose, but all machines heretofore used have had certain drawbacks. The principal success has been with machines for producing frozen milk products and soft ice creams and even in these machines proper refrigeration has been a problem. If the machine is in constant production the rate of heat absorption must be adequate to accommodate the heat added to the mixing chamber by the addition of the ingredients thereto and this rate is sufficient to cause the product to solidify if the machine is quiescent for any considerable length of time. This required taking the machine apart and cleaning with loss of time. If the refrigeration controls are set to prevent such solidification, the product is not sufficiently chilled during periods of continuous production. Heretofore, most of the attempts to deal with this problem have sought to provide a manually operable control for the heat absorption rate of the refrigeration system that the operator adjusted from time to time in an effort to meet the conditions imposed by varying demand. This results in lack of uniformity of product and in some cases in condemnation of the machine by health authorities due to the fact that the product may not meet standards imposed by law. These standards require that the product be maintained within very restricted limits of temperature regardless of production demand and in the case of those products having both fluid and gaseous ingredients, that the proportion of such ingredients be maintained under all conditions of production demand. In the latter case, the successful meeting of such standards has not been achieved except by the practice of putting the fluid ingredients in a container and subjecting the container contents to a stirring action by a suitable mixing machine while the customer waited for the mixing to be completed.

With these considerations in mind, the principal object of the present invention is to provide a machine for preparing and constantly maintaining a supply of prepared cold food product in which the temperature of the supply is maintained within narrow limits, is automatically replenished in response to withdrawal of product therefrom, and in which there is automatic increase in the rate of heat absorption to compensate for added heat deriving from the said automatic replenishing of the supply of finished product.

Another object of the invention is to provide a machine of the above character in which when employed to produce a beverage comprising both gaseous and liquid ingredients, the automatic replenishing of the supply of finished product includes means insuring the addition of the liquid and gaseous ingredients to the supply in predetermined proportions.

A further object of the invention is to provide a machine for preparing cold comestibles from a supply replenished in response to production demand including a refrigeration means and a control means for the refrigeration means automatically responsive to withdrawal of finished product to increase the rate of heat absorption with resultant compensation for the added heat of the replenished ingredients and to reduce the rate of heat absorption during periods when the machine is idle.

Still another object of the invention is to provide a machine for maintaining a supply of prepared cold beverage together with means responsive to withdrawal of the prepared beverage to replenish the supply to the extent of withdrawal and to agitate or mix the supply with resultant incorporation of the added ingredients with the rest of the supply.

A still further object of the invention is to provide a machine for maintaining a constant supply of prepared cold comestible which is simple in construction and in which all parts coming in contact with the product or the ingredients of the product may be readily disassembled and rendered accessible for cleaning.

Still another object of the invention is to provide a machine for maintaining a supply of cold, milk base beverages ready for dispensing as required in which means is provided for automatic maintenance of uniform mixture of the ingredients and of uniform temperature of the finished product.

A still further object of the invention is to provide a machine in which the foregoing objectives are realized in practice, which is simple and sturdy in construction, is economical to manufacture, does not require skilled operating personnel, and is reliable in operation.

Figure 14:
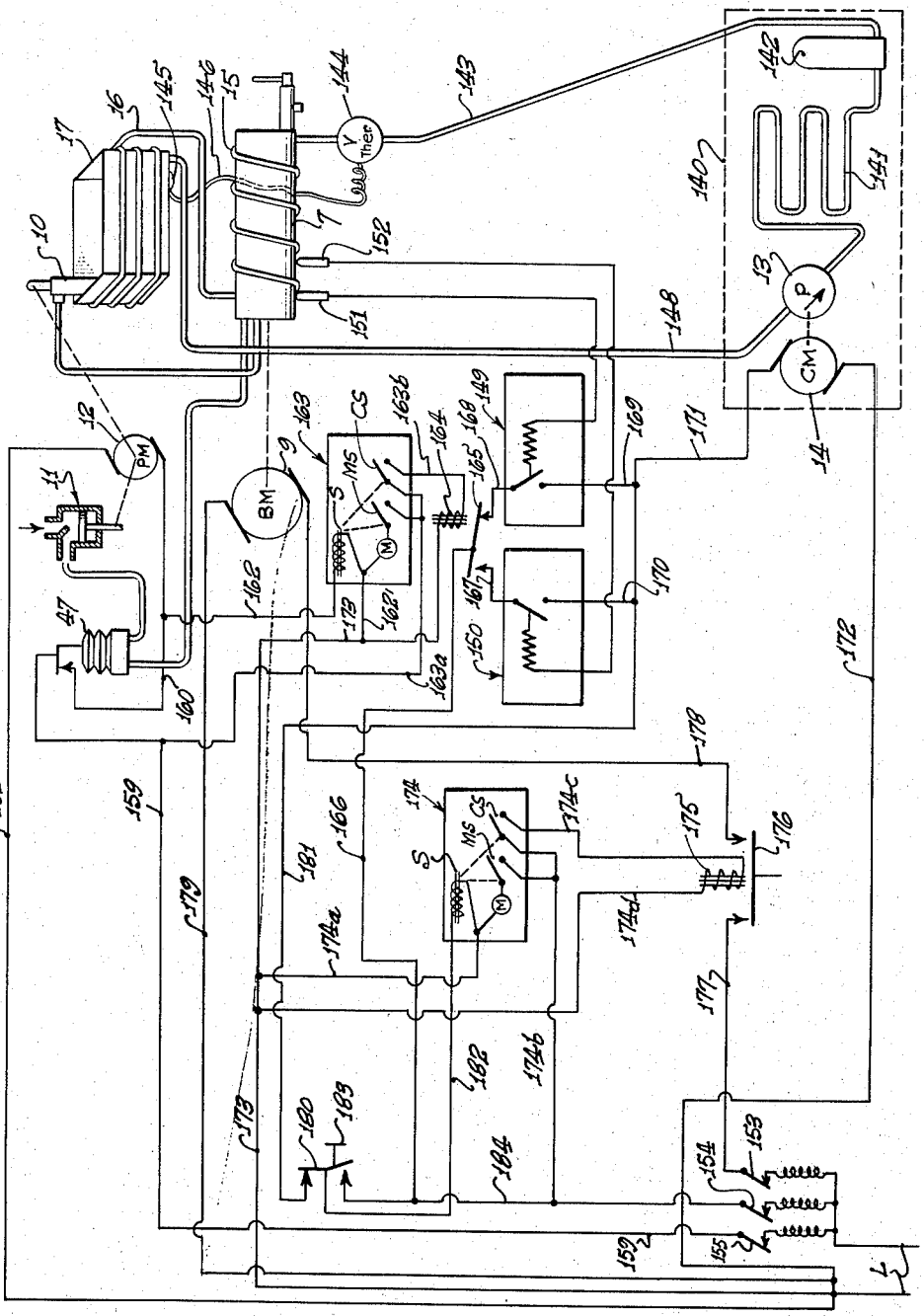

With the foregoing objects in view, together with such additional objects and advantages as may subsequently appear, the invention resides in the parts, and in the construction, combination and arrangement of parts, described by way of example, in the following specification of a presently preferred mode of execution of the invention; reference being had to the accompanying drawings which form a part of said specification and in which drawings:

Fig. 1 is a front perspective view of a machine in which the present invention is embodied; a portion of a side wall being broken away to show interior details and the cover for the supply tank being removed and shown alongside the machine, Fig. 2 is a rear perspective view of the machine shown in Fig. 1, Fig. 3 is an enlarged scale top plan view of the interior of the machine; portions of the top panel and supply tank covers being shown in place for clearness of illustration, Fig. 4 is a further enlarged, fragmentary, sectional view taken on the line 4—4 of Fig. 3, Fig. 5 is a still further enlarged, longitudinal medial sectional view of the fluid pump means; the view being taken on the line 5—5 of Fig. 4, Fig. 6 is a sectional view taken on the line 6—6 of Fig. 4 showing a detail of the fluid pump supporting means, Fig. 7 is an enlarged scale sectional view of the mixing chamber and agitator means; the view being taken on the line 7—7 of Fig. 3, Fig. 8 is an enlarged, transverse sectional view taken on the line 8—8 of Fig. 7 showing the means for holding the parts of the dispensing faucet in demountable assembly, Fig. 9 is a fragmentary side elevational view showing a detail of the means for securing the end closure cap to the end of the mixing chamber, Fig. 10 is a transverse, sectional view taken substantially on the line 10—10 of Fig. 7, Fig. 11 is an enlarged sectional view showing details of the fluid seal for the agitator shaft at the inner end of the mixing chamber, Fig. 12 is a fragmentary, partially sectional view of the rear end of the mixing chamber showing the removable sight indicator for fluid level within the mixing chamber; the view being taken on the line 12—12 in Fig. 13, Fig. 13 is an exploded view of the removable parts associated with the mixing chamber and including a fragmentary perspective view of the rear end of the mixing chamber to facilitate understanding of the relation between certain of the illustrated parts, Fig. 14 is a combined product flow sheet and circuit diagram showing the flow of product through the machine, the devices acting on the product, and the control means for said devices, and Fig. 15 is a fragmentary, schematic diagram showing the adaptation of the machine to the use of a compressed gas other than air as an ingredient of the finished product.

Referring to the drawings in general, the machine comprises a cabinet 1 including side plates 2, 2, a front plate 3, a rear plate 4 covering the upper portion of the rear of the machine, and a removable top cover plate 5 having certain openings therethrough together with supplementary cover elements to which detailed reference will later be made; all of said plates being enameled or otherwise presenting an exterior surface which will readily indicate the presence of soiling and which may easily be cleaned.

The main components of the illustrated machine comprise a removable supply tank 6 having a removable cover 6′, a mixing chamber 7 in which a mixing and mix advancing auger 8 is mounted for rotation, an auger motor 9 operably connected to the auger 8, a fluid pump 10 for delivering fluid from the tank 6 to the chamber 7, an air pump 11 for delivering compressed air to the chamber 7, a pump motor 12 operably connected to the pumps 10 and 11 for operation of said pumps in unison, and a refrigeration unit comprising a compressor 13, a compressor motor 14 and refrigeration coils connected to the compressor and comprising a first group of coils 15 encircling the chamber 7 and thence leading to a second group of coils 16 surrounding the cavity 17 in which the supply tank 6 is removably disposed.

Before entering into a detailed description of the machine, a general recitation of the mode of operation of the machine in use will be helpful. Assuming that the machine is in operation with the chamber 7 filled with prepared product ready to be dispensed, the supply tank has a supply of the ingredients which are premixed except for the addition of the desired amount of air, and that the air pump has imposed the required pressure on the contents of the chamber, upon opening the dispensing faucet, the product flowing therefrom will produce a pressure drop in the chamber whereupon a pressure switch connected to the chamber will close the operating circuits for the pump and auger motors each of which will then operate for times which are separately determined, i.e., the pump motor will operate until the cut-off pressure is restored to the chamber and the auger motor continues to rotate the auger until a time delay control means opens that circuit. The temperature controls comprise a working control means and a holding control means. On initiation of a dispensing operation, the working control means is energized and the holding control means which is normally operative is cut out. The holding control means is set to start and stop the compressor motor at a lower temperature than the point at which the holding control operates. The working control means and holding control means are, in turn, energized by a time delay circuit control means which is automatically caused to place one or the other in operation. The purpose of the working control means is to apply increased refrigeration to the chamber upon the entry of added fluid and air incident to withdrawal of finished product and upon the completion of a dispensing operation the time delay circuit control means operates after a predetermined interval to return the temperature control to the holding control means. Thus, when the machine is kept busy by successive dispensing operations, the working control means is in constant control of the refrigeration means causing the absorption of the added heat entering the chamber through the constantly added fluid and air, and when the demand ceases, the holding control again is energized to cause the refrigeration means to maintain the then quiescent contents of the chamber at the lowest temperature at which they will readily flow through the dispensing faucet; it being understood that the rate of heat absorption required when the machine is working would be sufficient to congeal the product when quiescent for any length of time. The specific details of the structure of the machine and the interrelation of the various component parts will be hereinafter described in detail.

*Mixing chamber supplying means*

The supply means for the mixing chamber 7 comprises the fluid pump 10 and the air pump 11 both driven by the motor 12. The fluid pump 10 comprises a cylindrical barrel 18 provided with a laterally extending arm 19 near its upper end, said arm having a reduced diameter bearing portion 20 at its outer end which is journaled in a bearing block 21 carried by the upper end of a vertically disposed frame member 22 adjacent one side of the supply tank 6 and positioning the pump barrel 18 within the tank with the lower end of the barrel closely adjacent the bottom of the tank (see Fig. 4). The bearing portion 20 is interrupted by a peripheral groove 23 which is engaged by a spring biased plunger 24 carried by the bearing block 21 effective to releasably hold the bearing assembled. The pump barrel 18 at its lower end is provided with a valve seat 24 formed by the juncture of the smaller diameter inlet port 25 with the interior of the barrel and a metal ball 26 within the pump barrel normally closes this valve seat. Mounted for reciprocation in the pump barrel 18 is a hollow plunger 27 provided with circumferential grooves 28 and 29 adjacent its upper and lower ends; said grooves containing O-ring gasket elements 30 and 31 engaging the inner wall of the pump barrel. The upper end of the plunger is closed and terminates in a flattened portion 32 adapted for detachable connection with an operating means presently to be described. The lower end of the plunger 27 is reduced in diameter to form a valve seat 33 normally closed by a ball 34. The pump barrel 18 adjacent the upper end thereof is provided with a laterally extending nipple 35 communicating with the interior of the barrel and the plunger 27 in the portion thereof which traverses the plane of the nipple 35 incident to reciprocation of the plunger is cut away at both sides thereof to provide outlet ports 36, 36 one of which will always be in registry with the nipple 35 regardless of which way the plunger is mounted on its reciprocating means. At least one of the cut away portions 36 is sufficiently wide to permit the ball 34 to be removed from the plunger and replaced incident to cleaning the machine after use. The nipple 35 is connected by a removable hose 37 with a nipple 38 carried by and communicating with the interior of the chamber 7.

The gaseous ingredient of the beverage (in the present instance, air, although other gases such as carbon dioxide might be employed for certain beverages) is supplied to the chamber 7 by a diaphragm type of pump 39. The pump is mounted on a frame member 39' and includes an intake 40 having a variable orifice adjusting means and a discharge port 41 connected by a tube 42 to a nipple fitting 43 projecting through the rear panel 4. A detachable hose 44 connects the nipple 43 with a nipple 45 on the removable cap element 46 of a pressure responsive electric switch 47 and a second hose 48 interconnects a second nipple 49 carried by the cap 46 and a nipple 50 carried by and communicating with the interior of the chamber 7. The cap 46 is provided with a pair of diametrically opposite L-shaped slots which interlockingly engage complementary radially extending pins on the switch body one of said slots 51 and the complementary pin 52 being shown in Fig. 4. Additionally, the outer surface of the pressure switch body which is engaged by the depending skirt portion 53 of the cap 46 is provided with a peripheral recess 54 in which an O-ring gasket 55 is located to provide a seal against pressure loss.

The pumps 10 and 39 are driven by the motor 12, which in the present embodiment of the invention, is a vertical axis motor mounted on the frame member 22. The motor includes gear reduction means terminating in a transverse shaft 56 carrying a crank pin 57. A link 58 connects the crank pin 57 with the mid length portion of a lever 59 one end of which is pivotally mounted on a frame member 60 and the other end of which is provided with a longitudinal slot 61 engaged by a pin 62 extending laterally from the side of a pump operating rod 63 guided for vertical reciprocation by suitable means eliminating friction as, for example, by two pairs of rollers 64 carried by the frame member 22; the slot 61 compensating for the arcuate movement of the lever and the straight line movement of the rod 63. The rod 63 at its upper end terminates in a horizontal portion 65 having a distal end 66 of reduced diameter which engages the hole 67 in the end portion 32 of the pump plunger 27. In assembly the locking of the arm 19 in the block 21 holds the plunger engaged with the pump driving rod.

The lever 59 in the region thereof between the fulcrum point 60 and the connection with the driving link 58 carries a second link 68 which is connected to the diaphragm element of the air pump 11. Thus it will be noted that as the lever 59 is oscillated by the motor 12, the fluid pump 10 and air pump 11 will be operated in unison and will deliver their respective ingredients to the chamber 7 in a constant proportionate relationship.

*Mixing chamber and agitator*

The mixing chamber 7 comprises a horizontally disposed cylindrical body carried by the front panel 3 and a frame member 69 engaging the side wall 70 thereof and having a rear end 71 into which the nipples 38 and 50 extend. The opposite end of the chamber is open and protrudes through the front panel 3 of the machine frame. A cover member 72 is provided with a skirt portion 73 which engages the outer surface of the protruding portion of the chamber and engages an O-ring gasket 74 mounted in a recess 75 in the outer face of the chamber side wall; the said skirt portion being provided with oppositely disposed L-shaped slots 76, 76 which engage complementary radially extending pins 76' to lock the cover member in detachable engagement on the end of the chamber 7. Near its bottom portion, the cover member 72 is provided with an outwardly extending tube 77 forming the frame of a quickly demountable faucet construction; said tube having a smaller depending tube 78 extending therefrom at about its midlength. A valve member 79 is rotatably mounted in the outer end of the tube 77 and is provided with an axial bore 80 extending from the inner end thereof to the transverse plane containing the depending tube 78 at which point it terminates in a transverse bore 81. At its outer end, the valve member 79 is provided with an operating handle 82 and within the tube 77 and adjacent the outer end thereof, the valve member 79 is provided with a peripheral groove 83 which is in registry with a slot 84 in the tube 77; said slot (see Fig. 8) extending through the wall of the tube 77 except for a portion 85 at the lower side thereof which is equal in width to the inner diameter of the tube 77. A flat, U-shaped clip element 86 closely fits the slot 84 and the bottom of the throat portion of this clip engages the groove 83 and holds the valve member 79 against endwise movement in the tube 77. Between the groove 83 and the cross bore 81 the valve member is provided with a second peripheral groove 87 in which an O-ring gasket 88 is contained to engage the inner wall surface of the tube 77 to prevent leakage. The bore 81 is preferably disposed at right angles to the handle 82 and thus when the handle is in vertical position, the faucet is closed and when the handle is in horizontal position at either side, the chamber contents will flow through the bore 80 and the portion of the cross bore 81 that is in registry with the depending tube 78 and through the depending tube 78 into a container into which the beverage is dispensed. For convenience, the front of the machine may be provided with a shelf 89 to carry a supply of containers (usually paper cups) and beneath the faucet, this shelf may be provided with a small removable cup 89' to catch any drippings from the faucet. The agitator 8 is mounted for rotation in the chamber 7 and comprises a shaft 90 disposed in the axial line of the chamber 7 and having a reduced diameter end 91 journaled in a bushing 92 removably mounted in a socket 93 formed on the inner face of the cover 72 and having its opposite end 94 extending through the end wall 71 of the chamber 7 and terminating in a reduced diameter end portion terminating in a distal end 95 of semicircular cross section which closely fits within a sleeve 96 carried by and projecting beyond the end of an aligned driving shaft 97 which shaft, within the sleeve, terminates also in an end portion of semicircular cross section whereby said semicircular sections overlie one another (see Fig. 7) with resultant driving interengagement while permitting the agitator to be readily removed from the chamber and replaced incident to cleaning the machine. It is to be noted that the support for the shaft 90 is the bearing in the bushing 92 and the bearing which supports the driving shaft 97; there being a clearance for the shaft 90 at the point at which it passes through the end wall 71 of the chamber. The shaft 97 is the driven shaft of a speed reducer assembly which is integrally associated with the agitator motor 9 mounted in the upper portion of the frame of the machine to the rear of the chamber 7 and alongside the motor 12 and devices driven thereby.

Mounted on the shaft 90 within the chamber 7 are a series of agitator members 100, 101, 102, 103 and 104 which are generally identical in configuration as viewed in plan and which are spaced at substantially equal distances apart along the shaft. The agitator members each are welded or otherwise fixedly secured to the shaft 90 and each comprises a flat portion 105 through which the shaft 90 passes said portion (see Fig. 10) having an outer edge which barely clears the inner wall of the chamber 7 and extends for about two thirds of the periphery of the inner wall; said edge being interrupted by a deep notch 106 and by a straight edge portion 107 about 90° from said notch. Extending in advance of the flat portion 105 in the direction of rotation of the agitator is a mix advancing tongue 108 which is generally sector shaped and includes a leading end portion 109 generally parallel to and laterally offset towards the inner end of the chamber 7 and a base portion 110 which slopes toward and merges into the plane of the portion 105

(see Fig. 7). As the agitator unit 8 is rotated, the leading end portions and the base portions 110 of the agitator tend to move the chamber contents toward the front end of the chamber and the notches 106 allow the advanced mixture to slip back toward the rear of the chamber as do also the clearance spaces 111 between the inner edges of the members 109 and the adjacent edges of the portions 105. The outer edges of the portions 109 and 110 are also disposed in close but clearing adjacency to the inner wall of the chamber. Also for uniformity of mixing action the agitator members are differently circumferentially arranged about the shaft 90; the illustrated arrangement showing the members 100, 101 and 103 substantially parallel while the members 102 and 104 are substantially oppositely arranged. Means is also provided for preventing the accumulation of the mixture on the wall of the chamber comprising scraper members 112 and 113 each having a cross sectional form as shown in Fig. 10. The scraper members are formed from a suitable non-metallic and non-toxic material which has good wearing characteristics; those illustrated being formed from lignum vitae wood. The scraper 112 extends from the rear face of the portion 105 of the member 103 to the rear end of the chamber 7 and is provided with a series of spaced holes 114 into which radial aligned bosses 115 on the agitator members 100, 101 and 102 engage to drive the scraper member as the agitator unit is rotated; the sloping leading edge 116 on the scraper member serving to urge it into sufficiently close contact with the chamber side wall to prevent the formation of solidified mix thereon. The scraper member 113 is provided with two spaced holes 117 which are similarly engaged by bosses 118 on the agitator members 103 and 104 at a point diametrically opposite the member 112 and similarly serves to scrape the chamber wall from the portion 105 of the member 102 to the inner face of the cover 72.

To prevent the escape of the chamber contents at the point at which the shaft 90 extends through the end wall 71 of the chamber, the said end wall is provided with a bushing 119 having a head 120 within the chamber and having an axial bore 121 somewhat larger than the shaft and through which the shaft extends to its end portion 94. Loosely mounted on the shaft 90 is a collar 122 having a counter bore 123 in its end face 124 in which is located a resilient O-ring 125 which protrudes beyond the collar and engages the face of the bushing head 120 and also tightly engages the periphery of the shaft 90 preventing escape of fluid between the shaft and the collar. The collar 122 carries a pair of diametrically oppositely disposed pins 129 and 130 extending outwardly from the face opposite the counterbore portion 123. The pins 129 and 130 are positioned for engagement by the tangentially extending end 132 of a combined compression and torsion spring 133 mounted on the shaft 90 between the agitator member 100 and collar 122 and having a second tangentially extending end terminating in a portion 134 which engages the notch 106 in the agitator member 100. The released axial length of the spring 133 is considerably greater than the space between the adjacent faces of the agitator member 100 and the collar 122 and in placing the agitator unit in the chamber and closing the chamber with the cover 72, this spring is compressed with resultant imposing of a yielding load on the collar and its O-ring gasket and thus preventing escape of fluid between the collar and the head 120 of the bushing as well as between the collar and the shaft. The spring 133 is wound so that the rotation of the agitator tends to unwind the spring. It is to be noted that the pins 129 and 130 serve to cause the collar to rotate with the shaft. Additionally, the chamber may be provided with a sight glass to determine the level of the fluid contents such as the transparent plug 135 provided with an O-ring gasket 136 and removably disposed in an opening 137 in the rear end 71 of the chamber.

Cleaning the machine

The foregoing sections of the specification have dealt with the portions of the machine which come into contact with the beverage and its ingredients together with the actuating means for those portions. Since the product of the machine is a food product for human consumption, it is essential that the machine be so designed that those parts coming in contact with the product and its ingredients may be readily cleaned. To this end, the hoses 37, 44 and 48 engage the respective nipples with a tight friction engagement only and are therefore readily removed; the cavity 138 at the rear end of the chamber 7 having a removable cover 139 to afford access for attaching and detaching the hoses 37 and 48 with the nipples carried by the chamber 7 and for removing and replacing the sight glass 135. The removable top cap 46 of the pressure switch 47 is disposed above the plane of the top panel and is readily removable for cleaning the inside of the cap and the pressure responsive surface enclosed by the cap.

After disconnection of the hose 37, the pump 10 is removed as a unit by releasing the plunger 24 and moving the pump out of engagement with the bearing block 21 and the operating member 63. After removal, the plunger can be pulled out of the pump and upon removal, the valve ball 34 can be removed through one of the ports 36 after which the valve ball 26 can be removed from the pump barrel. Since the O-rings 30 and 31 are carried on the exterior of the plunger, they can be removed from their respective grooves and replaced after the cleaning is completed. The supply tank 6 is removable from the cavity in which it is located.

The faucet means carried by the chamber cover 72 is also readily disassembled for cleaning and upon removal of the chamber cover 72, the agitator unit is readily removed and the various separate component parts thereof removed therefrom for cleaning leaving only the smooth interior of the chamber remaining on the machine to be cleaned in place. It is particularly to be noted that the complete disassembly and re-assembly of these parts is achieved without resort to tools and that all of the gaskets employed are of the common and readily available O-ring type of gasket. It is further to be noted that the parts are so designed as to prevent assembly thereof in a wrong manner.

Refrigeration system

The illustrated refrigeration system includes a combined motor and compressor unit 140 housed in the base of the machine and including in addition to the compressor 13 and motor 14, an evaporator coil 141 and a receiver 142. A liquid line 143 leads from the receiver to a thermostatically responsive expansion valve 144 controlled, for example, by a thermo-responsive, fluid containing bulb 145 contacting the discharge end of the coil 16 surrounding the supply tank cavity; said bulb being connected to the valve 144 by a capillary line 146. The gas line leads from the valve 144 and first forms the coil 15 surrounding the chamber 7, there being a wrapping of insulating material 147 surrounding the coil 15. Thence the gas line leads to form the coil 16 which surrounds the sides of the frame structure forming the cavity 17 into which the supply tank is received and thence in a run 148 to the intake or suction side of the compressor. It is to be noted that there is an air space surrounding the supply tank so that the effect of the refrigeration is merely to keep the tank contents cool. The control means for starting and stopping the action of the compressor include a holding control switch 149 and a working control switch 150; said switches being controlled by their respective thermo-responsive control elements 151 and 152 which contact the exterior of the chamber 7. The holding control switch is set to maintain a temperature within the chamber that is the lowest temperature at which the chamber contents will remain fluid though quiescent over a considerable time, while the working control switch is set to maintain a higher rate of heat absorption to absorb the added heat caused by the addition of beverage ingredients to the chamber; said rate being sufficient to congeal the beverage contents were it to be maintained for any considerable length of time while the chamber contents were quiescent. A relay means presently to be described, maintains one or the other of the switches 149 and 150 connected with a source of energy in automatic response to the conditions of operation of the machine.

*Control system*

Certain elements of the control system have heretofore been mentioned in the general description of the machine and in the more specific description of the structure of the machine and the following description of such control components is in connection with their relationship to other control elements which have not heretobefore been described to the end that understanding of the construction and mode of operation of the entire control system as a unit may be had. Operating current is supplied to the machine through leads L one side of which is led through three combined manual switch and circuit breaker units 153, 154 and 155. The circuit for operating the pump motor 12 comprises the lead 159 from the switch unit 155 to one side of the contacts of the pressure switch 47. Another lead 160 extends from the other side of the pressure switch to one side of the pump operating motor 12 and a third lead 161 extends from the other side of the motor to the other side of the leads L. The pressure switch employed is a standard article of commerce and is adjusted to close the above circuit upon a pressure drop to a predetermined value and to open the circuit at another and higher predetermined value. Thus upon opening the faucet to withdraw beverage from the chamber 7, the pressure drop resulting therefrom will cause the pressure switch to close the above identified circuit with resultant operation of both pumps until the switch opening pressure is restored and since both pumps operate in unison the chamber will be replenished with air and fluid to the extent of withdrawal therefrom in the mixed beverage.

A lead 162 extends from the lead 160 to one side of an electrically closed, time delay opening relay 163 which operates an electro magnet 164 effective upon energization to operate a transfer switch 165 with resultant disconnection of the thermo-responsive switch 149 from the power lead 166 leading from the manual switch 154 and with resultant connection of the thermo-responsive switch 150 with that lead 166. The relay is a standard type of electrical apparatus and includes clockwork mechanism which, upon energization of the relay by the starting current, is reset to and held at zero position and continues to hold the relay closed for a predetermined time after cessation of the starting current and then opens the circuit initially closed by the relay. In the present instance, upon closing of the pressure switch, the relay is caused to energize the magnet 164 with resultant transfer of the refrigeration control from the holding control switch to the working control switch and so long as the pressure switch holds the pump operating circuit closed, the working control switch will control the refrigeration means causing the motor and compressor to operate and shut off as required by the thermal bulb 152 actuating the switch 150. Since the switch 150 is set to open at a lower temperature than switch 149, the switch 150 is normally in closed position when switch 149 is in control. When the pressure switch opens the pump motor circuit, the current supply to the relay 163 is also cut off and at that point the clockwork means of the relay 163 continues to maintain the circuit which energizes the electromagnet 164 closed for the time (usually a few seconds) for which it is set and then opens that circuit with resultant transfer of the refrigeration control back to the holding control means. The power circuit for the compressor motor 14 has heretofore been traced from the manual switch 154 to the transfer switch 165. Leads 167 and 168 connect the switches 150 and 149, respectively and leads 169 and 170 join to form lead 171 leading to one side of the motor 14. Lead 172 extends from the opposite side of the motor to the other of the source lines L.

The function of this dual control for the refrigeration means is to absorb the added heat of ingredients as and while they are being introduced into the chamber with the result that the chamber contents are maintained at the temperature determined by the holding control means.

A lead 173 connects the relay 163 with a second electrically closed, time delay opening relay 174 which is of the same type as the relay 163. The relay 174 is energized concurrently with the relay 163 and closes a circuit including an electro-magnet 175 which closes a switch 176 in the circuit which operates the agitator motor 9; said circuit including the lead 177 extending from the switch 153 to the switch 176, the lead 178 extending therefrom to the motor 9, and the lead 179 extending from the motor 9 to the other of the source lines L.

The relay 174 being connected in series with the relay 163 is energized simultaneously with the relay 163 upon closing of the pump operating circuit by the pressure switch 47 and the clock work mechanism continues to hold the energizing circuit for the electromagnet 175 closed for a predetermined interval after the starting circuit is opened by the pressure switch. The resultant closing of the switch 176 effects operation of the agitator and that operation continues for the predetermined interval controlled by the clockwork of the relay 174. This interval, depending on the type of product, is not necessarily the same as the interval for which the clockwork of the relay 163 may be set and by employing two of these relays, the range in which the machine may be adjusted to suit different requirements imposed by different products is greatly increased. While the above control is achieved by an arrangement of certain standard units and represents the best presently known arrangement for the purpose, it is appreciated that still other components could be employed for the same purpose and achieve the operating relationship of the various components of the machine.

Means is also provided for restoring the machine to operating standard when it has been standing idle for a considerable length of time with possible separation of the chamber contents and some loss of pressure in the chamber less than enough to close the pressure switch 47. This means comprises a transfer switch 180 normally connecting a lead 181 extending from the compressor motor power lead 171 with a lead 182 extending from the relay 174 and permanently connected to the transfer switch 180. This switch is operated by a push button 183 projecting from the front of the machine near the dispensing faucet 77 and when operated by said button disconnects the lead 181 and connects the lead 182 with a lead 184 connected to the power lead 166 for the transfer switch 165. The momentary operation of the transfer switch will actuate the relay 174 with resultant operation of the agitator motor for the time for which the relay 174 is set; said time being sufficient to insure the proper remixing of the contents in the chamber 7 and scraping from the wall of the chamber of any portion of the contents which may have started to solidify. In practice, this button is pushed from time to time by the attendant during periods when the machine is idle and at the time of drawing contents from the chamber when the machine has been standing idle for any length of time.

While the relays 163 and 174 are devices obtainable on the open market, the drawings show the circuits of a representative form of such a relay. Each relay comprises a controlling solenoid S, a timing motor M, a motor controlling switch MS, and a circuit controlling switch CS. Upon energization of the solenoid S, switches MS and CS are closed, to thus energize and start motor M by closure of switch MS, and to close the controlled circuit by closure of switch CS. These switches remain closed even after solenoid S is de-energized, the switches being then latched in closed position by mechanism controlled by the timer motor. The motor continues to operate for a predetermined time interval and then automatically releases the latch mechanism to open both switches.

Referring specifically to relay 163, the solenoid S thereof is energized by closing of switch 47, the energizing circuit including leads 159, 160, 162, 162', and 173. Upon closure of switch MS, current is supplied to the motor M through lead 163a which extends from one side of the switch MS to the lead 159, the return being through leads 162' and 173. The lead 163a is also connected to one side of the switch CS, whose opposite side is connected by a lead 163b to electromagnet 164, and through it to lead 173. Thus electromagnet 164 is energized when switch CS is closed.

Referring next to the relay 174, one side of the solenoid S thereof is connected by the lead 182 to the common terminal of the transfer switch 180, whereby it may be energized either through lead 181 or lead 184. The opposite side of solenoid S of relay 174 is connected by a lead 174a to the return lead 173. The switch MS of relay 174 when closed connects one side of timer motor M to a lead 174b extending to the power lead 184, with the opposite side of the motor circuit being completed through the lead 174a. Closure of switch CS of relay 174 connects the lead 174b with a lead 174c leading to the electromagnet 175, the circuit to this magnet being completed by a lead 174d and lead 173.

When relay 163 is initially energized by closure of pressure switch 47, with resultant closing by switch 165 of a circuit through the normally open thermo-responsive switch 150 (to thus switch to the operating control 150 for the refrigerating mechanism) current flows from the lead 170 through lead 181, transfer switch 180 and lead 182, to simultaneously actuate relay 174 and close its switches MS and CS, and thereby energize agitator motor 13. When switch 47 is opened, transfer switch 165 returns after a delay period to its holding condition in which the refrigeration mechanism is controlled by thermo-responsive switch 149. Also, the relay 174 will then open its switches and thereby stop the motor 9 at the expiration of the delay period for which relay 174 is adjusted.

It is noted that whenever a circuit is closed between lead 166 and lead 181 by either thermo-responsive switch 149 or 150 (whichever is at the time in use), this closure of the circuit acts to energize solenoid S of relay 174, with consequent actuation of the motor 9 and the agitator until the temperature in the cylinder is reduced and the controlling thermo-responsive switch 149 or 150 opened again. Also, it is to be noted that manual actuation of the transfer switch by pushbutton 183 will similarly actuate relay 174, with consequent operation of the agitator motor for the time during which button 183 is pressed, plus the delay time for which relay 174 is set.

The general operation of the machine is believed to be obvious. Once the chamber 7 is filled with the ingredients the machine proceeds automatically to replenish the chamber in response to withdrawal of the completed product and to maintain the agitating and mixing operation as ingredients are added. Additionally the novel refrigeration control also operates in response to withdrawal of completed product to increase the rate of heat absorption to compensate for the heat added by the newly supplied ingredients and to return to a lesser rate of heat absorption when the machine is not engaged in production to prevent solidification of the product in the chamber. Additionally a manually operable means is provided to institute operation of the agitator when such operation is desirable.

*Other forms*

Referring finally to Fig. 15 there is shown diagramatically a means of supplying a gaseous ingredient other than air in the preparation of product in which such other gaseous ingredient (carbon dioxide, for example) is employed. As here shown the container of compressed gas G is connected to a receiver R with an interposed reducing valve V bringing the pressure in the receiver to approximately atmospheric pressure. The receiver R is connected by a conduit C to the intake of the pump 11. Thus the machine may be employed without change in its structure to include gaseous ingredients other than air in the preparation of beverages and other comestibles.

Mention has heretofore been made of the adaptability of the machine for the manufacture of ice cream and frozen milk products as well as other frozen products of a consistency susceptible of flow through a dispensing faucet. In such products, air or other gas is not an essential ingredient and is kept to a minimum. The adaptation of the machine for such use involves only the disconnection of the pump 11 from the pressure switch and the closure of the nipple 45 by a suitable closed plug or cap or, alternatively, the substitution of a pressure switch cap having a single nipple only connected by the hose 48 to the chamber 7, the adjustment of the thermo-responsive switches to the temperatures required by the product, and, in some cases, the use of an agitator unit having more of the blade area disposed at an angle to increase the tendency to move the chamber contents toward the front end of the chamber. Generally, the temperatures to be maintained will be similar; the decrease in the fluidity of the product deriving mainly from the absence of air or other gas from the product which can best be described as semi-fluid in consistency.

*Conclusion*

While the foregoing specification describes the best embodiments of the invention presently known to me, it is appreciated that in the light of the foregoing disclosure, changes and modifications will suggest themselves to others skilled in the art. Therefore, the invention is not to be deemed to be limited to the exact embodiment above disclosed by way of example, but to include as well all such changes and modifications in the parts, and in the construction, combination and arrangement of parts as shall come within the purview of the appended claims.

I claim:

1. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration and from which the product is dispensed while being prepared for consumption, pump means interposed between said container and said chamber operable to transfer product ingredients from said container to said chamber in opposition to the pressure in said chamber, a motor operatively connected to said pump means, valve means operative to permit the flow of prepared product from said chamber when and as required, a pressure responsive switch interposed between said motor and a source of energy and operatively connected to the interior of said chamber, said switch being effective upon a pressure drop in said chamber deriving from withdrawal of product from said chamber to connect said motor and the energy source and to disconnect said motor and the energy source upon restoration of said predetermined pressure in said chamber through transfer of ingredients thereto, refrigeration means including heat absorbtion means engaging said chamber, and refrigeration control devices including devices effective to increase the rate of heat absorption from said chamber by said refrigeration means simultaneously with initiation of the said transfer of ingredients and during at least part of the time said motor is connected to the energy source and is causing said pump means to transfer ingredients to said chamber.

2. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration while being prepared for consumption and pump means interposed between said container and said chamber operable to transfer product ingredients from said container to said chamber in opposition to the pressure in said chamber, a motor operatively connected to said pump means, valve means operative to permit the flow of prepared product from said chamber when and as required, a pressure responsive switch interposed between said motor and a source of energy and operatively connected to the interior of said chamber, said switch being effective upon a pressure drop in said chamber deriving from withdrawal of product from said chamber to connect said motor and the energy source and to disconnect said motor and the energy source upon restoration of said predetermined pressure in said chamber through transfer of ingredients thereto, refrigeration means including heat absorption means engaging said chamber, and refrigeration control devices including devices normally effective to cause said refrigeration means to maintain a decreased rate of heat absorption from said chamber and other devices responsive to a pressure drop in said chamber effective to increase the rate of heat absorption from said chamber by said refrigeration means simultaneously with initiation of the said transfer of ingredients and during at least part of the time said motor is connected to the energy source and is causing said pump means to transfer ingredients to said chamber.

3. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration while being prepared for consumption, pump means interposed between said container and said chamber operable to transfer product ingredients from said container to said chamber in opposition to the pressure in said chamber, a motor operatively connected to siad pump means, valve means operative to permit the flow of prepared product from said chamber when and as required, a pressure responsive switch interposed between said motor and a source of energy and operatively connected to the interior of said chamber said switch being effective upon a pressure drop in said chamber deriving from withdrawal of product from said chamber to connect said motor and the energy source and to disconnect said motor and the energy source upon restoration of said predetermined pressure in said chamber through transfer of ingredients thereto, refrigeration means including heat absorption means engaging said chamber, and refrigeration control devices including devices normally effective to cause said refrigeration means to maintain a decreased rate of heat absorption from said chamber and other devices operatively connected to said pressure responsive switch effective to increase the rate of heat absorption from said chamber by said refrigeration means simultaneously with initiation of the said transfer of ingredients and during at least part of the time said motor is connected to the energy source and is causing said pump means to transfer ingredients to said chamber.

4. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration while being prepared for consumption, pump means interposed between said container and said chamber operable to transfer product ingredients from said container to said chamber in opposition to the pressure in said chamber, a motor operatively connected to said pump means, valve means operative to permit the flow of prepared product from said chamber when and as required, a pressure responsive switch interposed between said motor and a source of energy and operatively connected to the interior of said chamber said switch being effective upon a pressure drop in said chamber deriving from withdrawal of product from said chamber to connect said motor and the energy source and to disconnect said motor and the energy source upon restoration of said predetermined pressure in said chamber through transfer of ingredients thereto, refrigeration means including an actuating motor and a heat absorbing means engaging said chamber, and refrigeration control devices including a first thermostatically responsive switch interposed between said refrigeration means actuating motor and the energy source and having a temperature sensing element engaging said chamber; said switch being adjusted to disconnect said motor from the energy source at a predetermined higher minimum temperature, a second thermostatically responsive switch connected in parallel with said first thermostatically responsive switch and including a separate temperature sensing element engaging said chamber; said second switch being adjusted to disconnect said motor from the energy source at a predetermined lower minimum temperature than said first switch, a relay means interposed between both of said thermostatically responsive switches and the energy source and normally effective to maintain said first thermostatically responsive switch connected to the energy source, and means responsive to withdrawal of product from said chamber effective to cause said relay means to disconnect said first switch from the energy source and to connect said second thermostatically responsive switch to the energy source.

5. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration while being prepared for consumption, pump means interposed between said container and said chamber operable to transfer product ingredients from said container to said chamber in opposition to the pressure in said chamber, a motor operatively connected to said pump means, valve means operative to permit the flow of prepared product from said chamber when and as required, a pressure responsive switch interposed between said motor and a source of energy and operatively connected to the interior of said chamber said switch being effective upon a pressure drop in said chamber deriving from withdrawal of product from said chamber to connect said motor and the energy source and to disconnect said motor and the energy source upon restoration of said predetermined pressure in said chamber through transfer of ingredients thereto, refrigeration means including an actuating motor and a heat absorbing means engaging said chamber, and refrigeration control devices including a first thermostatically responsive switch interposed between said refrigeration means actuating motor and the energy source and having a temperature sensing element engaging said chamber; said switch being adjusted to disconnect said motor from the energy source at a predetermined higher minimum temperature, a second thermostatically responsive switch connected in parallel with said first thermostatically responsive switch and including a separate temperature sensing element engaging said chamber; said second switch being adjusted to disconnect said motor from the energy source at a predetermined lower minimum temperature than said first switch, a relay means including an actuator means electrically connected to said pressure responsive switch and contact means interposed between both of said thermostatically responsive switches and the energy source normally maintaining connection of said first switch with the energy source and effective upon closing of said pressure responsive switch to connect said second switch and the energy source and simultaneously disconnect said first switch and the energy source.

6. In a machine for preparing and dispensing a refrigerated food product capable of flow through a dispensing faucet, a closed chamber in which the product ingredients are mixed and subjected to refrigeration, a faucet through which prepared product is dispensed from said chamber when and as required, a container adapted to hold a supply of fluid ingredients from which the product is prepared, pump means for transferring ingredients from said container to said chamber, power means operatively connected to said pump means, control means for said power means automatically responsive to dispensing of product from said chamber through said faucet to connect said power means with a source of energy with resultant transfer of fluid ingredients to said chamber by said pump means; said control means being operative to disconnect said power means and energy source upon replenishment of said chamber to the extent of withdrawal required to fill said chamber, agitator means in said chamber, other power means exteriorly of said chamber operatively connected to said agitator means, control devices interposed between the energy source and said other power means effectively to connect said other power means with the energy source coincident with the operation of said first power means, refrigeration means including heat absorption means engaging said chamber, and control devices for said refrigeration means including devices automatically responsive to said effect deriving from withdrawal of product and operative by said response to increase the rate of heat absorption from said chamber by said refrigeration means simultaneously with the initiation of the replenishment of said chamber and during at least part of the time said pump actuating power means is connected to the energy source.

7. In a machine for preparing and dispensing a refrigerated food product capable of flow through a dispensing faucet, a closed chamber in which the product ingredients are mixed and subjected to refrigeration, a faucet through which prepared product is dispensed from said chamber when and as required, a container adapted to hold a supply of fluid ingredients from which the product is prepared, pump means for transferring ingredients from said container to said chamber, power means operatively connected to said pump means, control means for said power means responsive to and effect deriving from dispensing of product from said chamber through said faucet to connect said power means with a source of energy with resultant transfer of ingredients to said chamber; said control means being operative to disconnect said power means and energy source upon replenishment of said chamber to an extent substantially equal to the extent of withdrawal of product therefrom, agitator means in said chamber, other power means exteriorly of said chamber operatively connected to said agitator means, control devices interposed between the energy source and said other power means effective to connect said other power means with the energy source coincident with the operation of said first power means, refrigeration means including heat absorption means engaging said chamber, and control devices for said refrigeration means including devices effective normally to maintain a predetermined lower rate of heat absorption from said chamber and other devices automatically responsive to an effect deriving from fluid flow through said faucet effective to increase the rate of heat absorption from said chamber by said refrigeration means simultaneously with the initiation of the replenishment of said chamber and during at least part of the time said pump actuating power means is connected to the energy source.

8. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration while being prepared for consumption, pump means interposed between said container and said chamber operable to transfer product ingredients from said container to said chamber in opposition to the pressure in said chamber, a motor operatively connected to said pump means, valve means operative to permit the flow of prepared product from said chamber when and as required, a pressure responsive switch interposed between said motor and a source of energy and operatively connected to the interior of said chamber effective upon a pressure drop in said chamber deriving from withdrawal of product from said chamber to connect said motor and the energy source and to disconnect said motor and the energy source upon restoration of said predetermined pressure in said chamber deriving from replenishment of ingredients to said chamber, an agitator means in said chamber, a second motor disposed exteriorly of said chamber operatively connected to said agitator means, control means for said second motor operatively connected to said pressure responsive switch effective to connect said last named motor to the energy source simultaneously with the connection of said first named motor to the energy source, refrigeration means including heat absorption means engaging said chamber, and refrigeration control devices including devices effective to increase the rate of heat absorption from said chamber by said refrigeration means simultaneously with the initiation of and during at least part of the time said motors are connected to the energy source.

9. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration while being prepared for consumption, pump means interposed between said container and said chamber operable to transfer product ingredients from said container to said chamber in opposition to the pressure in said chamber, a motor operatively connected to said pump means, valve means operative to permit the flow of prepared product from said chamber when and as required, a pressure responsive switch interposed between said motor and a source of energy and operatively connected to the interior of said chamber effective upon a pressure drop in said chamber deriving from withdrawal of product from said chamber to connect said motor and the energy source and to disconnect said motor and the energy source upon restoration of said predetermined pressure in said chamber deriving from replenishment of ingredients to said chamber, an agitator means in said chamber, a second motor disposed exteriorly of said chamber operatively connected to said agitator means, control means for said second motor operatively connected to said pressure responsive switch effective to connect said last named motor to the energy source simultaneously with the connection of said first named motor to the energy source, refrigeration means including heat absorption means engaging said chamber, and refrigeration control devices including devices normally effective to cause said refrigeration means to maintain a decreased rate of heat absorption from said chamber and other devices responsive to a pressure drop in said chamber effective to increase the rate of heat absorption from said chamber by said refrigeration means simultaneously with the initiation of and during at least part of the time said motors are connected to the energy source.

10. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration while being prepared for consumption, pump means interposed between said container and said chamber operable to transfer product ingredients from said container to said chamber in opposition to the pressure in said chamber, a motor operatively connected to said pump means, valve means operative to permit the flow of prepared product from said chamber when and as required, a pressure responsive switch interposed between said motor and a source of energy and operatively connected to the interior of said chamber effective upon a pressure drop in said chamber deriving from withdrawal of product from said chamber to connect said motor and the energy source and to disconnect said motor and the energy source upon restoration of said predetermined pressure in said chamber deriving from replenishment of ingredients to said chamber, an agitator means in said chamber, a second motor disposed exteriorly of said chamber operatively connected to said agitator means, control means for said second motor operatively connected to said pressure responsive switch effective to connect said last named motor to the energy source simultaneously with the connection of said first named motor to the energy source, refrigeration means including heat absorption means engaging said chamber, and refrigeration control devices including devices normally effective to cause said refrigeration means to maintain a decreased rate of heat absorption from said chamber and other devices operatively connected to said pressure responsive switch effective to increase the rate of heat absorption from said chamber by said refrigeration means simultaneously with the initiation of and during at least part of the time said motors are connected to the energy source.

11. In a machine for preparing and dispensing a refrigerated food product capable of fluid flow, a container adapted to hold a supply of fluid ingredients of the product, a closed chamber in which the product ingredients are subjected to a predetermined pressure greater than atmospheric pressure and refrigeration while being prepared for consumption, pump means interposed between said container and said chamber operable to transfer product ingredients from said container to said chamber in opposition to the pressure in said chamber, a motor operatively connected to said pump means, valve means operative to permit the flow of prepared product from said chamber when and as required, a pressure responsive switch interposed between said motor and a source of energy and operatively connected to the interior of said chamber effective upon a pressure drop in said chamber deriving from withdrawal of product from said chamber to connect said motor and the energy source and to disconnect said motor and the energy source upon restoration of said predetermined pressure in said chamber deriving from replenishment of ingredients to said chamber, an agitator means in said chamber, a second motor disposed exteriorly of said chamber operatively connected to said agitator means, control means for said second motor operatively connected to said pressure responsive switch effective to connect said last named motor to the energy source simultaneously with the connection of said first named motor to the energy source, refrigeration means including an actuating motor and a heat absorbing means engaging said chamber, and refrigeration control devices including a first thermostatically responsive switch interposed between said refrigeration means actuating motor and the energy source and having a temperature sensing element engaging said chamber; said switch being adjusted to disconnect said motor from the energy source at a predetermined higher temperature, a second thermostatically responsive switch connected in parallel with said first thermostatically responsive switch and including a separate temperature sensing element engaging said chamber; said second switch being adjusted to disconnect said motor from the energy source at a lower temperature than said first switch, and a relay means interposed between both of said thermostatically responsive switches and the energy source and normally effective to maintain said first thermostatically responsive switch connected to the energy source, and means automatically responsive to an effect deriving from withdrawal of product from said chamber effective to cause said relay means to disconnect said first switch from the energy source and to connect said second thermostatically responsive switch to the energy source.

12. In a machine for preparing and dispensing refrigerated beverages comprising a combination of solid, fluid and gaseous ingredients, a supply source for premixed solid and fluid ingredients, a closed chamber in which the ingredients are combined and normally maintained subjected to a predetermined pressure to form the beverage for consumption, valve means through which beverage is withdrawn from said chamber when and as required, a first pump means interposed between said supply source and said chamber effective to transfer the pre-mixed ingredients to said chamber, a second pump means having the discharge thereof connected to said chamber and effective to deliver a gaseous ingredient into said chamber in a pre-determined proportion to the volume of pre-mixed ingredients delivered by said first pump means, a motor operatively connected to both of said pumps and effective to cause said pumps to deliver the respective ingredients to said chamber in opposition to the pressure in said chamber, a rotatable agitator in said chamber, a motor exteriorly of said chamber, means extending through a wall of said chamber operatively connecting said last named motor and said agitator, control devices responsive to pressure drop in said chamber deriving from withdrawal of beverage therefrom effective to connect both of said motors with an energy source until the contents of said chamber are replenished in the said relative proportion to an extent sufficient to re-establish said predetermined pressure, and refrigeration means including heat absorption elements engaging said chamber and said supply source.

13. In a machine for preparing and dispensing refrigerated beverages comprising a combination of solid, fluid and gaseous ingredients, a supply source for pre-mixed solid and fluid ingredients, a closed chamber in which the ingredients are combined and normally maintained subjected to a predetermined pressure to form the beverage for consumption, valve means through which beverage is withdrawn from said chamber when and as required, a first pump means interposed between said supply source and said chamber effective to transfer the pre-mixed ingredients to said chamber, a second pump means having the discharge thereof connected to said chamber and effective to deliver a gaseous ingredient into said chamber in a pre-determined proportion to the volume of pre-mixed ingredients delivered by said first pump means, a motor operatively connected to both of said pumps and effective to cause said pumps to deliver the respective ingredients to said chamber in opposition to the pressure in said chamber, a rotatable agitator in said chamber, a motor exteriorly of said chamber, means extending through a wall of said chamber operatively connecting said last named motor and said agitator, a pressure responsive switch connected to the interior of said chamber including electrical contact means effective upon pressure drop in said chamber deriving from withdrawal of beverage therefrom to connect both of said motors with an energy source until the contents of said chamber are replenished in the said relative proportion to an extent sufficient to re-establish said predetermined pressure, and refrigeration means including heat absorption elements engaging said chamber and said supply source.

14. In a machine for preparing and dispensing refrigerated beverages comprising a combination of solid, fluid and gaseous ingredients, a supply source for premixed solid and fluid ingredients, a closed chamber in which the ingredients are combined and normally maintained subjected to a predetermined pressure to form the beverage for consumption, valve means through which beverage is withdrawn from said chamber when and as required, a first pump means interposed between said supply source and said chamber effective to transfer the pre-mixed ingredients to said chamber, a second pump means having the discharge thereof connected to said chamber and effective to deliver a gaseous ingredient into said chamber in a pre-determined proportion to the volume of pre-mixed ingredients delivered by said first pump means, a motor operatively connected to both of said pumps and effective to cause said pumps to deliver the respective ingredients to said chamber in opposition to the pressure in said chamber, a rotatable agitator in said chamber, a motor exteriorly of said chamber, means extending through a wall of said chamber operatively connecting said last named motor and said agitator, control devices responsive to pressure drop in said chamber deriving from withdrawal of beverage therefrom effective to connect both of said motors with an energy source until the contents of said chamber are replenished in the said relative proportion to an extent sufficient to re-establish said predetermined pressure, refrigeration means including a pair of heat responsive control elements separately engaging said chamber, and means for selectively subjecting said refrigeration means to the control of one or the other of said control elements.

15. In a machine for preparing and dispensing refrigerated beverages comprising a combination of solid, fluid and gaseous ingredients, a supply source for premixed solid and fluid ingredients, a closed chamber in which the ingredients are combined and normally maintained subjected to a predetermined pressure to form the beverage for consumption, valve means through which beverage is withdrawn from said chamber, when and as required, a first pump means interposed between said supply source and said chamber effective to transfer the premixed ingredients to said chamber, a second pump means having the discharge thereof connected to said chamber and effective to deliver a gaseous ingredient into said chamber in a pre-determined proportion to the volume of pre-mixed ingredients delivered by said first pump means, a motor operatively connected to both of said pumps and effective to cause said pumps to deliver the respective ingredients to said chamber in opposition to the pressure in said chamber, a rotatable agitator in said chamber, a motor exteriorly of said chamber, means extending through a wall of said chamber operatively connecting said last named motor and said agitator, control devices for said motors comprising a pressure responsive switch including a fixed contact element and a movable contact element subject to pressure in said chamber and movable into engagement with said fixed contact upon pressure drop in said chamber deriving from withdrawal of beverage therefrom and effective by said engagement to maintain said first motor connected to an energy source until a predetermined pressure is restored in said chamber, other switch means electrically actuated by closure of said pressure responsive switch operable to connect said second motor with the energy source, and means for maintaining the contents of said chamber and said supply source under refrigeration.

16. In a machine for preparing and dispensing refrigerated beverages comprising a combination of solid, fluid and gaseous ingredients, a supply source for premixed solid and fluid ingredients, a closed chamber in which the ingredients are combined and normally maintained subjected to a predetermined pressure to form the beverage for consumption, valve means through which beverage is withdrawn from said chamber when and as required, a first pump means interposed between said supply source and said chamber effective to transfer the pre-mixed ingredients to said chamber, a second pump means having the discharge thereof connected to said chamber and effective to deliver a gaseous ingredient into said chamber in a pre-determined proportion to the volume of pre-mixed ingredients delivered by said first pump means, a motor operatively connected to both of said pumps and effective to cause said pumps to deliver the respective ingredients to said chamber in opposition to the pressure in said chamber, a rotatable agitator in said chamber, a motor exteriorly of said chamber, means extending through a wall of said chamber operatively connecting said last named motor and said agitator, control devices for said motors comprising a pressure responsive switch including a fixed contact element and a movable contact element subject to pressure in said chamber and movable into engagement with said fixed contact upon pressure drop in said chamber deriving from withdrawal of beverage therefrom and effective by said engagement to maintain said first motor connected to an energy source until said pre-determined pressure is restored in said chamber through delivery thereto of ingredients by said pumps, other switch means electrically actuated by closure of said pressure responsive switch operable to connect said second motor with the energy source, and means for maintaining the contents of said chamber and said supply source under refrigeration; said other switch means comprising circuit closing means electrically connected to and actuated by closing of said pressure responsive switch and circuit opening means actuated by opening of said pressure responsive switch and operating to open the actuating circuit for said last named motor at a predetermined time interval after opening of said pressure responsive switch.

17. In a machine for preparing and dispensing refrigerated beverages comprising a combination of solid, fluid and gaseous ingredients, a supply source for pre-mixed solid and fluid ingredients, a closed chamber in which the ingredients are combined and normally maintained subjected to a predetermined pressure to form the beverage for consumption, valve means through which beverage is withdrawn from said chamber when and as required, a first pump means interposed between said supply source and said chamber effective to transfer the pre-mixed ingredients to said chamber, a second pump means having the discharge thereof connected to said chamber and effective to deliver a gaseous ingredient into said chamber in a pre-determined proportion to the volume of pre-mixed ingredients delivered by said first pump means, a motor operatively connected to both of said pumps and effective to cause said pumps to deliver the respective ingredients to said chamber in opposition to the pressure in said chamber, a rotatable agitator in said chamber, a motor exteriorly of said chamber, means extending through a wall of said chamber operatively connecting said last named motor and said agitator, control devices responsive to pressure drop in said chamber deriving from withdrawal of beverage therefrom effective to connect both of said motors with an energy source until the contents of said chamber are replenished to an extent sufficient to re-establish said predetermined pressure, means for maintaining the contents of said chamber under refrigeration, and control devices for said refrigeration means; said refrigeration control devices including devices normally effective to maintain a pre-determined lesser rate of heat absorption from said chamber and other devices responsive to actuation of said pressure drop responsive devices effective to impose a greater rate of heat absorption from said chamber simultaneously with the initiation of actuation of said pump means and during at least part of the time during which said pumps are actuated by said first named motor.

18. In a machine for preparing and dispensing refrigerated beverages comprising a combination of solid, fluid and gaseous ingredients, a supply source for pre-mixed solid and fluid ingredients, a closed chamber in which the ingredients are combined and normally maintained subjected to a predetermined pressure to form the beverage for consumption, valve means through which beverage is withdrawn from said chamber when and as required, a first pump means interposed between said supply source and said chamber effective to transfer the pre-mixed ingredients to said chamber, a second pump means having the discharge thereof connected to said chamber and effective to deliver a gaseous ingredient into said chamber in a pre-determined proportion to the volume of pre-mixed ingredients delivered by said first pump means, a motor operatively connected to both of said pumps and effective to cause said pumps to deliver the respective ingredients to said chamber in opposition to the pressure in said chamber, a rotatable agitator in said chamber, a motor exteriorly of said chamber, means extending through a wall of said chamber operatively connecting said last named motor and said agitator, control devices for said motors comprising a pressure responsive switch including a fixed contact element and a movable contact element subject to pressure in said chamber and movable into engagement with said fixed contact upon pressure drop in said chamber deriving from withdrawal of beverage therefrom and effective by engagement to maintain said first motor connected to an energy source until a predetermined pressure is restored in said chamber, other switch means electrically actuated by said pressure responsive switch operable to connect said second motor with the energy source, means for maintaining the contents of said chamber under refrigeration, and control devices for said refrigeration means; said refrigeration control devices including devices normally effective to maintain a lesser rate of heat absorption from said chamber and other devices electrically connected to said pressure responsive switch effective to impose a greater rate of heat absorption from said chamber simultaneously with engagement of said contact elements and during at least part of the time during which said pressure responsive switch contact elements are engaged.

19. In a machine for preparing and dispensing refrigerated beverages, a closed chamber in which the beverage ingredients are maintained under a predetermined pressure and prepared for consumption, faucet means for withdrawing prepared beverage from said chamber when and as required, means including a pressure responsive control means connected to said chamber automatically operative upon beverage withdrawal to replenish said chamber with beverage ingredients to an extent sufficient to re-establish said predetermined pressure, refrigeration means including a heat absorbing component engaging said chamber, and refrigeration control means connected to said pressure responsive control and effective automatically upon activation of said chamber replenishing means to impose a greater rate of heat absorption on said refrigeration means essentially simultaneously with initiation of replenishment of said chamber and during at least part of the time during which said chamber replenishing means is activated.

20. In a machine for preparing and dispensing refrigerated beverages, a closed chamber in which the beverage ingredients are maintained under a predetermined pressure and prepared for consumption, faucet means for withdrawing prepared beverage from said chamber when and as required, means including a pressure responsive control means connected to said chamber automatically operative upon beverage withdrawal to replenish said chamber with beverage ingredients to an extent sufficient to re-establish said predetermined pressure, refrigeration means including a heat absorbing component engaging said chamber, and refrigeration control means normally effective to impose a lesser rate of heat absorption by said refrigeration means and including devices responsive to said pressure responsive control effective automatically upon activation of said chamber replenishing means to imposed a greater rate of heat absorption on said refrigeration means essentially simultaneously with initiation of replenishment of said chamber and during at least part of the time during which said chamber replenishing means is activated.

21. In a machine for preparing and dispensing refrigerated food product from fluid ingredients, a closed chamber in which the product is prepared, an agitator means within said chamber, means exteriorly of said chamber and connected to said agitator means effective to impart movement to said agitator means, faucet means on said chamber through which prepared product is withdrawn when and as required, refrigeration means including a heat absorbing component engaging said chamber, a container for a supply of the product ingredients, a pump having an intake disposed in communication with the interior of said container and a discharge connected to the interior of said chamber and power means for actuating said pump, said pump comprising a vertically disposed tubular stationary component having an intake orifice at its lower end, a valve seat above said orifice and a ball resting on said valve seat and further having a laterally extending discharge port adjacent the upper end thereof connected to said chamber, a hollow plunger connected to said power means; said plunger being mounted for reciprocation in said stationary component and having gasket means engaging the interior of said stationary component adjacent the upper and lower ends thereof; said plunger being closed at its upper end and open at its lower end and having a valve seat disposed above said open lower end and a ball resting on and normally closing said valve seat, an elongated opening extending through the side wall of said plunger disposed longitudinally to remain in registry with said discharge port in said stationary component at all times during normal reciprocation of said plunger, means maintaining said opening and said port in alignment, and actuating means for imparting reciprocation to said plunger.

22. In a machine for preparing and dispensing refrigerated food product from fluid ingredients, a closed chamber in which the product is prepared, an agitator means within said chamber, means exteriorly of said chamber and connected to said agitator means effective to impart movement to said agitator means, faucet means on said chamber through which prepared product is withdrawn when and as required, refrigeration means including a heat absorbing component engaging said chamber, a container for a supply of the product ingredients, a pump having an intake disposed in communication with the interior of said container and a discharge connected to the interior of said chamber and power means for actuating said pump, said pump comprising a vertically disposed tubular stationary component having an intake orifice at its lower end, a valve seat above said orifice and a ball resting on said valve seat and further having a laterally extending discharge port adjacent the upper end thereof connected to said chamber, a hollow plunger connected to said power means; said plunger being mounted for reciprocation in said stationary component and having gasket means engaging the interior of said stationary component adjacent the upper and lower ends thereof; said plunger being closed at its upper end and open at its lower end and having a valve seat disposed above said open lower end and a ball resting on and normally closing said valve seat, an elongated opening extending through the side wall of said plunger disposed longitudinally to remain in registry with said discharge port in said stationary component at all times during normal reciprocation of said plunger, means maintaining said opening and said port in alignment, and actuating means for imparting reciprocation to said plunger; said elongated opening having sufficient width to permit said last named ball to be placed in and removed from the interior of said plunger.

23. In a machine for preparing and dispensing a refrigerated food product capable of fluid flow, a closed chamber in which the product ingredients are prepared for consumption and are maintained under refrigeration, refrigeration means including heat absorbing means engaging said chamber, a faucet means through which prepared product is withdrawn from said chamber when and as required, a container affording a supply source of liquid ingredients, pump means having an intake disposed in said container and a discharge connected to the interior of said chamber effective to transfer ingredients from said container to said chamber in opposition to pressure in said chamber, a driving motor operatively connected to said pump means, an agitator means in said chamber, a second driving motor disposed exteriorly of said chamber and operatively connected to said agitator means, a pressure switch pressure responsively connected to the interior of said chamber and including circuit closing and opening contacts interposed between said first motor and a source of energy, and a time delay opening relay means including circuit closing and opening contacts interposed between said second motor and the energy source and further including electrically actuated contact closing means electrically connected to said pressure switch effective upon energization of said first motor to substantially simultaneously effect energization of said second motor.

24. In a machine as claimed in claim 23, the combination of a manually operable switch interposed between the energy source and said electrically actuated contact closing means of said relay operable to connect said contact closing means directly with the energy source with resultant operation of said second motor independently of said first motor.

25. In a machine for preparing and dispensing a refrigerated food product capable of fluid flow, a closed chamber in which the product ingredients are prepared for consumption and are maintained under refrigeration, refrigeration means including heat absorbing means engaging said chamber, a faucet means through which prepared product is withdrawn from said chamber when and as required, a container affording a supply source of liquid ingredients, pump means having an intake disposed in said container and a discharge connected to the interior of said chamber effective to transfer ingredients from said container to said chamber in opposition to pressure in said chamber, a driving motor operatively connected to said pump means, an agitator means in said chamber, a second driving motor disposed exteriorly of said chamber and operatively connected to said agitator means, a pressure switch pressure responsively connected to the interior of said chamber and including circuit closing and opening contacts interposed between said first motor and a source of energy, and a time delay opening relay means including circuit closing and opening contacts interposed between said second motor and the energy source and further including electrically actuated contact closing means electrically connected to said pressure switch effective upon energization of said first motor to substantially simultaneously effect energization of said second motor; said refrigeration means further including a compressor and an actuating motor connected to said compressor and refrigeration control means interposed between said last named motor and the energy source including a first thermostatically responsive switch having a temperature sensing element in contact with said chamber; said switch being adjusted to connect said motor to the energy source at a predetermined higher temperature, a second thermostatically responsive switch connected in parallel to said first thermostatically responsive switch and including a separate temperature sensing element engaging said chamber; said second switch being adjusted to disconnect said motor from the energy source at a predetermined lower temperature, a relay means interposed between both of said thermostatically responsive switches and the energy source and effective normally to maintain said first thermostatically responsive switch connected to the energy source, and electrically energized means electrically connected to said pressure switch effective upon energization of said first named motor thereby to cause said last named relay means to transfer control of said refrigeration means to said second thermostatically responsive switch with resultant automatic increase in the rate of heat absorption from said chamber by said refrigeration means.

26. A machine for preparing and dispensing a refrigerated food product formed from ingredients including a liquid ingredient and a gaseous ingredient, said machine comprising a container for holding said liquid ingredient, a closed chamber in which the liquid and gaseous ingredients are combined under a predetermined superatmospheric pressure to form the product, a faucet actuable between open and closed conditions and through which the product is withdrawn from said chamber as desired, a power driven agitator in said chamber automatically controlled to intermittently start and stop as required to prepare and maintain said product, refrigerating means for cooling said chamber and including a cooling element in heat absorbing relation to said chamber, power driven pump means operable to pump said liquid ingredient and said gaseous ingredient into said chamber in substantially predetermined proportions and to continuously maintain the pressure of the ingredients above atmospheric pressure, and pressure actuated control means responsive to a drop in pressure in said chamber resulting from the withdrawal of product therefrom to commence the delivery of said liquid and gaseous ingredients to said chamber in said predetermined proportions and to continue said delivery until the chamber contents have been replenished to an extent sufficient to reestablish said predetermined pressure in the chamber, said pressure actuated control means being subjected to and actuated by the chamber pressure at a location in the chamber at which said pressure is substantially equal to the pressure at the location where said gaseous ingredient is injected into the chamber, whereby said pressure actuated control means are directly and closely responsive to increases in pressure produced by said pump means, said pump means being constructed to inject successive quantities of said liquid and gaseous ingredients into the chamber in said predetermined proportions, and said pump means being closed against reverse flow of either the liquid ingredient or the gaseous ingredient back from the chamber to said pump means so that the liquid and gaseous ingredients are always maintained in said predetermined proportions in the chamber.

27. A machine for preparing and dispensing a refrigerated food product formed from ingredients including a liquid ingredient and a gaseous ingredient, said machine comprising a container for holding said liquid ingredient, a closed chamber in which the liquid and gaseous ingredients are combined under a predetermined superatmospheric pressure to form the product, a faucet actuable between open and closed conditions and through which the product is withdrawn from said chamber as desired, a power driven agitator in said chamber automatically controlled to intermittently start and stop as required to prepare and maintain said product, refrigerating means for cooling said chamber and including a cooling element in heat absorbing relation to said chamber, power driven pump means operable to pump said liquid ingredient and said gaseous ingredient into said chamber in substantially predetermined proportions, and to continuously maintain the pressure of the ingredients above atmospheric pressure and pressure actuated control means responsive to a drop in pressure in said chamber resulting from the withdrawal of product therefrom to commence the delivery of said liquid and gaseous ingredients to said chamber in said predetermined proportions and continue said delivery until the chamber contents have been replenished to an extent sufficient to reestablish said predetermined pressure in the chamber, said faucet means being located at a first end of said chamber, said pump means being connected to the chamber at a location to inject said ingredients into the chamber near an opposite and second end thereof, and said pressure actuated control means being connected to the chamber toward said second end thereof, said pump means being constructed to inject successive quantities of said liquid and gaseous ingredients into the chamber in said predetermined proportions, and said pump means being closed against reverse flow of either the liquid ingredient or the gaseous ingredient back from the chamber to said pump means so that the liquid and gaseous ingredients are always maintained in said predetermined proportions in the chamber.

28. A machine for preparing and dispensing a refrigerated food product formed from ingredients including a liquid ingredient and a gaseous ingredient, said machine comprising a container for holding said liquid ingredient, a closed chamber in which the liquid and gaseous ingredients are combined under a predetermined superatmospheric pressure to form the product, a faucet actuable between open and closed conditions and through which the product is withdrawn from said chamber as desired, a power driven agitator in said chamber automatically controlled to intermittently start and stop as required to prepare and maintain said product, refrigerating means for cooling said chamber and including a cooling element in heat absorbing relation to said chamber, means for delivering said liquid and gaseous ingredients under pressure to said chamber and operable to continuously maintain the pressure of the ingredients above atmospheric pressure and including a conduit through which said gaseous ingredient flows under pressure before mixing with the liquid ingredient, and pressure actuated control means subjected to the pressure of said gaseous ingredient at the location of said conduit and responsive to a drop in the pressure thereof resulting from withdrawal of products from the chamber to commence the delivery of said liquid and gaseous ingredients to the chamber until the chamber contents have been replenished to an extent sufficient to reestablish said predetermined pressure in the chamber and conduit, said ingredient delivering means including pump means constructed to inject successive quantities of said liquid and gaseous ingredients into the chamber in predetermined proportions, and said ingredient delivering means being closed against reverse flow of either the liquid ingredient or the gaseous ingredient back from the chamber to said pump means so that the liquid and gaseous ingredients are always maintained in said predetermined proportions in the chamber.

29. A machine as recited in claim 28, in which said pump means include two separate pumping means for the liquid and gaseous ingredients respectively driven by a common motor.

30. A machine for preparing and dispensing a refrigerated food product formed from ingredients including a liquid ingredient and a gaseous ingredient, said machine comprising a container for holding said liquid ingredient, a closed chamber in which the liquid and gaseous ingredients are combined under a predetermined superatmospheric pressure to form the product, a faucet actuable between open and closed conditions and through which the product is withdrawn from said chamber as desired, a power driven agitator in said chamber automatically controlled to intermittently start and stop as required to prepare and maintain said product, refrigerating means for cooling said chamber and including a cooling element in heat absorbing relation to said chamber, first and second pumping means operable to separately pump said liquid ingredient and said gaseous ingredient respectively and discharging said ingredients under pressure into said chamber and operable to continuously maintain the pressure of the ingredients above atmospheric pressure, a common motor driving both of said pumping means in unison to deliver said liquid and gaseous ingredients to the chamber in substantially predetermined proportions, and pressure actuated control means responsive to a drop in pressure in said chamber resulting from the withdrawal of product therefrom to commence the simultaneous delivery of said liquid and gaseous ingredients to said chamber in said predetermined proportions by said two pumping means driven by a common motor, said two pumping means being closed against reverse flow of either the liquid ingredient or the gaseous ingredient back from the chamber to said pumping means so that the liquid and gaseous ingredients are always maintained in said predetermined proportions in the chamber.

31. A machine for preparing and dispensing a refrigerated food product formed from ingredients including a liquid ingredient and a gaseous ingredient, said machine comprising a container for holding said liquid ingredient, a closed chamber in which the liquid and gaseous ingredients are combined under a predetermined superatmospheric pressure to form the product, a faucet actuable between open and closed conditions and through which the product is withdrawn from said chamber as desired, a power driven agitator in said chamber automatically controlled to intermittently start and stop as required to prepare and maintain said product, refrigerating means for cooling said chamber and including a cooling element in heat absorbing relation to said chamber, first and second pumping means operable to separately pump said liquid ingredient and said gaseous ingredient respectively and discharging said ingredients under pressure into said chamber, a common motor driving both of said pumping means in unison to deliver said liquid and gaseous ingredients to the chamber in substantially predetermined proportions, and pressure actuated control means responsive to a drop in pressure in said chamber resulting from the withdrawal of product therefrom to commence the simultaneous delivery of said liquid and gaseous ingredients to said chamber in said predetermined proportions by said two pumping means driven by a common motor, said control means including a pressure actuated switch acting to start and stop said motor in accordance with variations in pressure in said chamber.

32. A machine as recited in claim 26, including thermostatic control means responsive to a rise in temperature in said chamber to automatically start said agitator and actuate said refrigerating means to a cooling condition.

References Cited in the file of this patent

UNITED STATES PATENTS

| | | |
|---|---|---|
| 2,013,018 | Vogt | Sept. 3, 1935 |
| 2,211,387 | Routh | Aug. 13, 1940 |
| 2,515,722 | Maranz | July 18, 1950 |
| 2,522,648 | Tacchella | Sept. 19, 1950 |
| 2,599,032 | Tacchella | July 3, 1951 |
| 2,560,664 | Sammy | July 17, 1951 |
| 2,596,876 | Taecker | May 13, 1952 |
| 2,687,019 | Swenson | Aug. 24, 1954 |
| 2,735,276 | Thompson | Feb. 21, 1956 |
| 2,737,024 | Swenson | Mar. 6, 1956 |
| 2,740,264 | Thompson | Apr. 3, 1956 |
| 2,746,260 | Swenson | May 22, 1956 |
| 2,760,344 | Oltz | Aug. 28, 1956 |
| 2,767,553 | Lewis | Oct. 23, 1956 |
| 2,827,773 | Detjen | Mar. 25, 1958 |